(12) United States Patent
Buniatyan

(10) Patent No.: US 12,182,125 B1
(45) Date of Patent: Dec. 31, 2024

(54) SYSTEMS AND METHODS FOR TRAINED EMBEDDING MAPPINGS FOR IMPROVED RETRIEVAL AUGMENTED GENERATION

(71) Applicant: Snark AI, Inc., Mountain View, CA (US)

(72) Inventor: Davit Buniatyan, Mountain View, CA (US)

(73) Assignee: Snark AI, Inc., Mountain View, CA (US)

( * ) Notice: Subject to any disclaimer, the term of this patent is extended or adjusted under 35 U.S.C. 154(b) by 0 days.

(21) Appl. No.: 18/443,237

(22) Filed: Feb. 15, 2024

(51) Int. Cl.
*G06F 17/00* (2019.01)
*G06F 11/34* (2006.01)
*G06F 16/2455* (2019.01)

(52) U.S. Cl.
CPC ...... *G06F 16/2455* (2019.01); *G06F 11/3409* (2013.01)

(58) Field of Classification Search
CPC .................. G06F 16/2455; G06F 11/3409
See application file for complete search history.

(56) References Cited

U.S. PATENT DOCUMENTS

| | | | | |
|---|---|---|---|---|
| 11,204,923 | B2* | 12/2021 | Sun | G06F 16/2455 |
| 11,599,518 | B2* | 3/2023 | Menghani | G06F 16/215 |
| 11,704,312 | B2* | 7/2023 | Pasternack | G06F 16/24534 707/765 |
| 2017/0075958 | A1* | 3/2017 | Duffy | G06F 16/2455 |
| 2019/0251184 | A1* | 8/2019 | Shan | G06N 3/045 |
| 2020/0356873 | A1* | 11/2020 | Nawrocke | G06F 11/3409 |
| 2021/0281593 | A1* | 9/2021 | Liu | G06F 16/9535 |

* cited by examiner

*Primary Examiner* — Greta L Robinson
(74) *Attorney, Agent, or Firm* — Foley & Lardner LLP

(57) ABSTRACT

Systems and methods for implementing trained embedding mappings for improved retrieval augmented generation are disclosed. A system can maintain a dataset comprising a first set of embeddings corresponding to a first embeddings space and stored in association with a set of query results for the first set of embeddings. The set of query results can correspond to a second embeddings space. The system can train a transformation data structure using the first set of embeddings and the set of query results. The transformation data structure can be used to transform the first set of embeddings to the second embeddings space. The system can execute a search operation for the second embeddings space by applying the transformation data structure to a second set of embeddings corresponding to the first embeddings space.

18 Claims, 5 Drawing Sheets

SYSTEMS AND METHODS FOR TRAINED EMBEDDING MAPPINGS FOR IMPROVED RETRIEVAL AUGMENTED GENERATION

BACKGROUND

Machine-learning datasets can be both large and varied, including large amounts of information in several different formats. The large size, complexity, and format of the dataset can create technical difficulties in managing and communicating the dataset between systems, storing the dataset, processing the dataset, and utilizing the dataset in machine-learning processes. It

SUMMARY

Machine-learning models can use embeddings to transform arbitrary data, including text or image data, to numerical data structures (e.g., vectors) in a continuous n-dimensional space (e.g., an embeddings space). Embeddings can be used to capture semantic or other relationships and contextual information, enabling algorithmic or model-based manipulation of arbitrary data. One such application of embeddings is embeddings search, where input data (e.g., input text data) is used to perform a search to identify similar or relevant portions of data from a large corpus. However, traditional approaches for embeddings search are often constrained by the configuration of the embeddings space within which searched embeddings are represented. This often results in incorrect or inaccurate information from being retrieved in response to embeddings searches, resulting in sub-optimal performance.

The systems and methods of this technical solution provide techniques for training and applying transformation data structures, which can be used to transform input embeddings in a first embeddings space to map to a target corpus. Training can be performed using a training dataset that represents mappings and significance between input embeddings and a target embeddings corpus. Once trained, the transformation data structure can be utilized in a variety of computing operations, including but not limited to retrieval augmented generation (RAG) or other vector search operations. The techniques described herein provide improvements to the accuracy and speed of embeddings search operations.

Additionally, the use of the techniques described herein can be used to reduce the necessary size and complexity of input prompts for large language models (LLMs) or other machine-learning models, thereby improving overall computational performance of machine-learning systems that utilize embeddings. Further, the techniques described herein are compatible with any suitable vector search process and can even be used to map embeddings that were previously incompatible for vector search operations, such as embeddings generated using different embeddings models or embeddings that represent different modalities. The techniques described herein therefore overcome the limitations of conventional embeddings search operations, while improving the accuracy and computational performance of vector search operations.

One aspect of the present disclosure is directed to a system. The system can include one or more processors coupled to memory. The system can maintain a dataset comprising a first set of embeddings corresponding to a first embeddings space and stored in association with a set of query results for the first set of embeddings. The set of query results can correspond to a second embeddings space. The system can train a transformation data structure using the first set of embeddings and the set of query results. The transformation data structure can be used to transform the first set of embeddings to the second embeddings space. The system can execute a search operation for the second embeddings space by applying the transformation data structure to a second set of embeddings corresponding to the first embeddings space.

In some implementations, the dataset further comprises a corpus of text data corresponding to the second embeddings space. In some implementations, the first embeddings space is different from the second embeddings space. In some implementations, the second embeddings space is a subset of the first embeddings space. In some implementations, the system can execute the search operation over a corpus of embeddings corresponding to the second embeddings space. In some implementations, the system can generate a set of transformed embeddings based on an intermediate transformation data structure and the first set of embeddings. In some implementations, the system can determine an error based on the set of transformed embeddings and the set of query results.

In some implementations, the system can update the intermediate transformation data structure according to the error to generate the transformation data structure. In some implementations, the system can determine the error based on a similarity search between the set of transformed embeddings and the set of query results. In some implementations, the system can receive a first query specifying the second set of embeddings. In some implementations, the system can execute the search operation in response to the first query. In some implementations, the system can execute the search operation during training of the transformation data structure in response to the first query.

One aspect of the present disclosure is directed to a method. The method can be performed, for example, by one or more processors coupled to memory. The method can include maintaining a dataset comprising a first set of embeddings corresponding to a first embeddings space and stored in association with a set of query results for the first set of embeddings. The set of query results corresponding to a second embeddings space. The method can include training a transformation data structure using the first set of embeddings and the set of query results. The transformation data structure to transform the first set of embeddings to the second embeddings space. The method can include executing a search operation for the second embeddings space by applying the transformation data structure to a second set of embeddings corresponding to the first embeddings space.

In some implementations, the dataset further comprises a corpus of text data corresponding to the second embeddings space. In some implementations, the first embeddings space is different from the second embeddings space. In some implementations, the second embeddings space is a subset of the first embeddings space. In some implementations, the method can include executing the search operation over a corpus of embeddings corresponding to the second embeddings space. In some implementations, training the transformation data structure can include generating a set of transformed embeddings based on an intermediate transformation data structure and the first set of embeddings. In some implementations, training the transformation data structure can include determining an error based on the set of transformed embeddings and the set of query results.

In some implementations, the method can include updating the intermediate transformation data structure according to the error to generate the transformation data structure. In some implementations, the method can include determining the error based on a similarity search between the set of transformed embeddings and the set of query results. In some implementations, the method can include receiving a first query specifying the second set of embeddings. In some implementations, the method can include executing the search operation in response to the first query. In some implementations, the method can include executing the search operation during training of the transformation data structure in response to the first query.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular forms of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
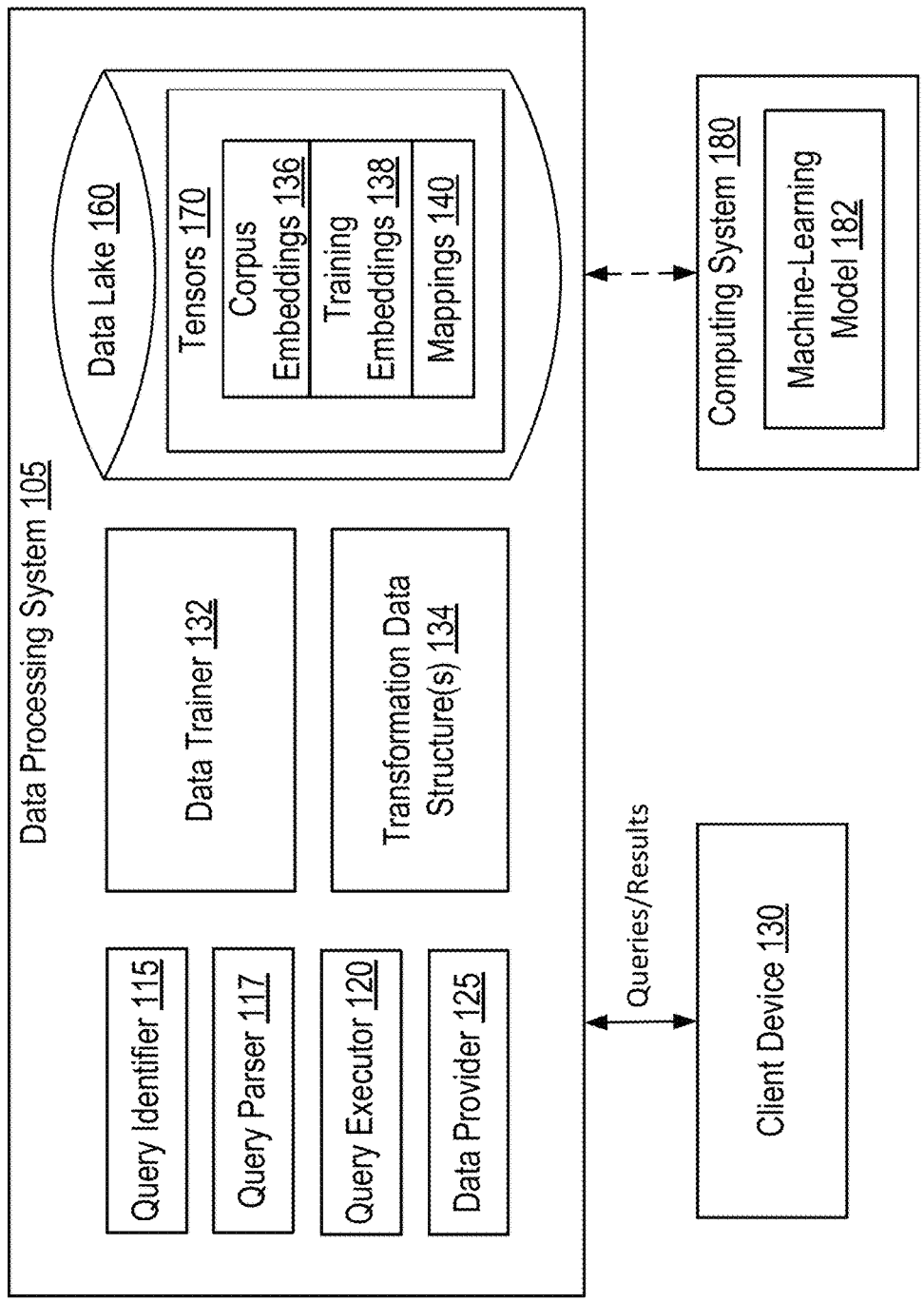
FIG. 1 illustrates a block diagram of an example data processing system that implements techniques for training and applying transformation data structures, for example, in connection with tensor queries, in accordance with one or more implementations.

Below are detailed descriptions of various concepts related to, and implementations of, techniques, approaches, methods, apparatuses, and systems for training and applying transformation data structures for embeddings. The various concepts introduced above and discussed in greater detail below may be implemented in any of numerous ways, as the described concepts are not limited to any particular manner of implementation. Examples of specific implementations and applications are provided primarily for illustrative purposes.

Embeddings can be used to transform arbitrary data, such as text or image data, to numerical data structures (e.g., vectors) in a continuous n-dimensional space (e.g., an embeddings space). The n-dimensional space in which the embeddings are generated, sometimes referred to herein as an "embeddings space," can be used to represent semantic or other relationships and contextual information, which enables algorithmic and model-based manipulation of arbitrary data. Retrieval augmented generation utilize embeddings search operations, in which input embeddings are used to identify similar embeddings in a pre-generated corpus, to identify relevant portions of data without necessarily re-training or updating machine-learning models. However, conventional approaches for retrieval augmented generation produce search results that may not accurately reflect the "correct" data that is identified in an input embedding. This is because the mappings between certain input data and their counterparts in an embeddings corpus are not utilized or considered during embeddings search operations.

The systems and methods of this technical solution provide techniques for training and applying transformation data structures, which can be used to transform input embeddings in a first embeddings space to map to a target corpus. Training can be performed using a training dataset that represents mappings and/or significance between input embeddings and a target embeddings corpus. Once trained, the transformation data structure can be utilized in a variety of computing operations and application, including but not limited to RAG. The techniques described herein provide improvements to the accuracy and speed of embeddings search operations (e.g., vector search operations in vector databases, etc.). Additionally, the use of the techniques described herein can be used to reduce the necessary size and complexity of input prompts for large language models (LLMs) or other machine-learning models, thereby improving overall computational performance of machine-learning systems that utilize embeddings.

The transformation data structures generated according to the techniques described herein can be used to map an input embeddings space to a target embeddings space and can be used in connection with any type of media modality. including text, images, video, or any other type of data for which embeddings can be generated. As such, the transformation data structures can be applied using the techniques described herein to effectively map embeddings of one media modality to another. For example, embeddings generated from text can be mapped to embeddings derived from image data using the transformation data structures described herein. The techniques described herein thereby extend the capabilities of systems that use embeddings by generating transformation data structures to map an arbitrary input embeddings space to an arbitrary target embeddings space.

Training, updating, or otherwise generating the transformation data structures can be performed according to a set of input example data mapped to a corresponding set of ground truth data. The ground truth data may correspond to portions of a pre-generated corpus of data having a target embeddings space, and may include additional metadata, such as significance scores, which can be used in the generation process for the transformation data structures described herein. In some implementations, machine-learning models (such as LLMs) can be used to generate labels for identified portions of a corpus based on a small number of examples.

Using the mappings between the example data and the corpus (or portions thereof), the systems and methods described herein can iteratively train the transformation data structure to map between generalized inputs from the input embeddings space to the target embeddings space of the corpus. The transformation data structures described herein can be applied for a variety of use cases, and improve the accuracy, efficiency, and computational performance of systems that process embeddings to perform various operations. Further details and improvements realized by this technology are described herein.

Referring now to FIG. 1, a data processing system 105 is shown that can implement techniques for training and applying transformation data structures 134, for example, in connection with tensor queries, retrieval augmented generation techniques, and/or general vector search operations, among others. The data processing system 105 can be a server system, a cloud-computing platform, a local computing system, a laptop computer, a desktop computer, a client device, or any other system that can process information. The data processing system 105 can be or include one or multiple computing nodes, servers, or distributed processing systems. The data processing system 105 can include a query identifier 115, a query parser 117, a query executor 120, a data provider 125, a data lake 160, a data trainer 132, and one or more transformation data structure(s) 134. The query identifier 115, the query parser 117, the query executor 120, the data provider 125, the data lake 160, the data trainer 132, and the transformation data structures 134 can include of software, applications, scripts, code, objects, hardware, the like, or combinations thereof that are configured to perform the various tasks, operations, and techniques described herein.

The query identifier 115, the query parser 117, the query executor 120, the data provider 125, the data lake 160, the data trainer 132, and the transformation data structures 134 can be implemented on a single data processing system 105 or implemented on multiple, separate data processing systems 105. The query identifier 115, the query parser 117, the query executor 120, the data provider 125, the data trainer 132, and/or the transformation data structure(s) 134 can be pieces of computer software, modules, software components, combinations of hardware and software components, or the like. Although various processes are described herein as being performed by the data processing system 105, it should be understood said operations or techniques may also be performed by other computing devices (e.g., the client device 130, the computing system 180), either individually or via communications with the data processing system 105. Similarly, other computing devices (e.g., the client device 130, the computing system 180) may include one or more of the components (e.g., the query identifier 115, the query parser 117, the query executor 120, the data provider 125, the data trainer 132, and/or the transformation data structure(s) 134) of the data processing system 105, and may carry out any of the various functionalities described herein.

The data lake 160 can be or include a data repository, a database, a set of databases a storage medium, a storage device, etc. The data lake 160 can store one or more tensors 170. The data lake 160 can store one or multiple different sets of tensors 170. For example, one set of tensors 170 can include one or more corpus embeddings 136, and another set of tensors 170 can include one or more training embeddings 138. Although shown as external to the data lake 160, in some implementations, the transformation data structures 134 can be stored in the data lake 160, for example, as one or more of the tensors 170 or otherwise. In some implementations, the transformation data structures are stored or otherwise maintained externally to the data lake 160, for example, in the memory of the data processing system 105, the client device 130, and/or the computing system 180.

The data lake 160 can be a computer-readable memory that can store or maintain any of the information described herein. The data lake 160 can store or maintain one or more data structures, which may contain, index, or otherwise store each of the values, pluralities, sets, variables, vectors, numbers, or thresholds described herein. The data lake 160 can be accessed using one or more memory addresses, index values, or identifiers of any item, structure, or region maintained in the data lake 160. The data lake 160 can be accessed by the components of the data processing system 105, or any other computing device described herein, for example, via suitable communications interface, a network, or the like. In some implementations, the data lake 160 can be internal to the data processing system 105. In some implementations, the data lake 160 can exist external to the data processing system 105 and may be accessed via a network or communications interface. The data lake 160 may be distributed across many different computer systems or storage elements.

The data processing system 105, the client device 130, and/or the computing system 180 can store, in one or more regions of the memory of the data processing system 105, or in the data lake 160, the results of any or all computations, determinations, selections, identifications, generations, constructions, or calculations in one or more data structures indexed or identified with appropriate values. Any or all values stored in the data lake 160 may be accessed by any computing device described herein, such as the data processing system 105, to perform any of the functionalities or functions described herein.

In some implementations, a computing device, such as a client device 130 and/or the computing system 180, may utilize authentication information (e.g., username, password, email, etc.) to show that the client device 130 and/or computing system 180 is authorized to access information the data lake 160 (or a particular portion of the data lake 160). The data lake 160 may include permission settings that indicate which users, devices, or profiles are authorized to access certain information stored in the data lake 160. In some implementations, instead of being internal to the data processing system 105, the data lake 160 can form a part of a cloud computing system. In such implementations, the data lake 160 can be a distributed storage medium in a cloud computing system and can be accessed by any of the components of the data processing system 105, by the one or more client devices 130 (e.g., via one or more user interfaces, etc.), or any other computing devices described herein.

In some implementations, the data processing system 105 can construct, generate, build, implement, or create one or more graphical user interfaces, which may be provided for display on the client device 130, and may display various data relating to queries, transformation data structures 134 (including training processes thereof), or any embeddings (or from which embeddings are generated) described herein, among other information. In some implementations, the data processing system 105 may provide display instructions to the client device 130 that cause the graphical user interface to be constructed, displayed, or rendered on the client device 130. The client device 130 may provide specified information via the graphical user interface.

The data lake 160 can store one or more tensors 170 in one or more data structures, which may be stored in one or more chunks described in connection with FIG. 2. The tensors 170 can include multi-dimensional arrays (e.g., n-dimensional arrays). For example, a tensor 170 can be a first order tensor (e.g., a scalar), a second order tensor (e.g., a vector), a third order tensor (e.g., a matrix), a fourth order tensor, or any other higher order tensor. The tensors 170 can include embeddings data, image data, text data, audio data, video data (e.g., frames, etc.), tags, labels, binary code, or any other type of data that may be utilized in machine-learning processes or operations. For example, one or more tensors 170 may include embeddings vectors that numerically represent data of any suitable modality (e.g., text, images, video, other data, etc.), as described herein.

The tensors 170 storing the embeddings vectors (e.g., the corpus embeddings 136, the training embeddings 138, etc.) can be accessed to perform various embeddings/vector search operations, as well as to iteratively generate/train/update one or more transformation data structures 134. In some implementations, the tensors 170 (or any subsets thereof) may be stored as part of a vector database maintained in the data lake 160. For example, one or more of the corpus embeddings 136 and/or the training embeddings 138 may be stored as part of one or more vector databases maintained by the data lake 160. In some implementations, a respective vector database or other storage data structure may be implemented in the data lake 160 to store various sets of information (e.g., a respective data storage data structure for the corpus embeddings 136 and/or the training embeddings 138, etc.).

In some implementations, the tensors 170 can include information relating to supervised learning, such as ground truth classifications, significance scores, labels, or data from which embeddings are generated, for example, using an embeddings model. For example, the training embeddings 138, which are described in further detail herein, may include or be stored in association with various information that facilitates mapping to one or more embeddings in the corpus embeddings 136. For example, a training embedding 136 vector(s) may be stored in association with corresponding identifiers of embeddings in the corpus embeddings 136 to which the training embedding 136 vector(s) are mapped. Additional metadata may also be stored, for example, significance scores that are proportional to, or otherwise indicate a strength of, the corresponding mapping. As described in further detail herein, this information may be utilized to iteratively generate/train/update one or more transformation data structures 134.

In some implementations, the data lake 160 can store one or more tensors 170 in one or more multiple chunks (e.g., binary chunks). Chunks can be stored in one or more columns, rows, a matrix, or other suitable data structures in the data lake 160. For example, the data lake 260 can utilize a columnar storage architecture, with tensors 170 stored in columns of a dataset. Each tensor 170 can be stored in a collection of chunks, which can be binary blobs that contain one or more tensors 170. In some implementations, multiple tensors 170, each of which may be stored in a respective column of the data lake 160, can be associated with a respective sample identifier, such that a sample of the data lake 160 is indicated as including multiple tensors. In one example, a sample can be represented as a row in the data lake 160, with each column including a respective tensor for the corresponding sample. An index map associated with each tensor 170 maps a corresponding chunk and index of a sample within that chunk for a given sample index.

In some implementations, each column of the data lake 160 can represent a specific tensor type (e.g., associated with a corresponding tensor identifier), the binary data of which is stored in at least one corresponding chunk. The binary data stored in the chunks can include or represent multi-dimensional arrays (e.g., tensor 170 data, etc.). In some implementations, each column may store tensors 170 having different numbers of dimensions (e.g., each column can represent a tensor 170 having a different order or different tensor 170 size). As opposed to a document storage format, samples in the data lake 160 can be logically independent, enabling partial access to samples for running performant queries or streaming selected tensors over the network to graphics processing unit (GPU) training instances. Multiple tensors 170 can be grouped. Groups implement syntactic nesting and define how tensors 170 are related to each other. Syntactic nesting avoids the format complication for hierarchical memory layout. Changes to the data lake 160, or portions thereof, can be tracked over time with version control, similar to dataset content changes. The information stored in the data lake 160 may sometimes be referred to herein as a multi-dimensional sample dataset.

In some implementations, the tensors 170 can be typed and can be appended or modified in-place. Default access to an index or a set of indices can return the data as arrays or other suitable data structures (e.g., NumPy arrays, etc.). The tensors 170 can accommodate n-dimensional data, where the first dimension may correspond to the index or batch dimension. The tensors 170 can include dynamically shaped arrays, also called ragged tensors, as opposed to other statically chunked array formats. The tensors 170 may also have a variety of metadata, such as types, which describe the content or format of the tensor data.

Individual tensors 170, chunks, or samples (or portions thereof stored within the tensors) may be compressed during onboarding using a suitable compression algorithm. The compression algorithm may be selected based on the type of data that is being compressed. For example, images may be compressed using a first compression algorithm or format encoding, while labels may be compressed using a second, different compression or encoding. When the information in the tensors 170 are retrieved and processed, decompression may be performed by the requesting computing device, or may be performed by the computing device providing the tensors 170.

Various types of tensors 170 may be stored in the data lake 160, for example, including various corpuses of text data, image data, video data, or other types of data that may be utilized to generate one or more embeddings. For example, the tensors 170 can store a corpus of data, which can be or include a structured collection of texts or data that is used for linguistic or statistical analysis. Various information that may be included in the tensors 170 include sets of documents, articles, or texts that are gathered and organized for research, training, or other analytical purposes. The corpus embeddings 136 can include one or more sets of embeddings vectors generated from one or more corresponding corpora of information.

Each of a set of corpus embeddings 136 can be or include an n-dimensional vector that is generated from a common corpus of data (which itself may be stored in one or more tensors 170) to which the set of corpus embeddings 136 corresponds. A set of corpus embeddings 136 can include embeddings that are generated for a particular corpus of information, and therefore may correspond to a particular data modality (e.g., one of text data, image data, audio data, video data, etc.). Each set of corpus embeddings 136 can include any type of embedding and can share a common embeddings space.

An embeddings space is the continuous n-dimensional vector space within which each of the embeddings of a set of corpus embeddings 136 are defined. In an embeddings space, the position of a vector represents a relative meaning of the corresponding data within the larger scope of the embeddings space. Similar or related data items are typically positioned close to each other in the embeddings space, capturing the relationships between them by virtue of proximity. The distances and directions between vectors in this space reflect the similarities and differences between the corresponding data. The embeddings space can include the same number of dimensions as each embedding in a corresponding set of corpus embeddings 136. In some implementations, each set of corpus embeddings can be defined as associated with its own respective embeddings space. In some implementations, one or more sets of corpus embeddings 136 can be generated as sharing an embeddings space.

A set of corpus embeddings 136 for a data corpus can be generated using a corresponding embeddings model. In some implementations, the data processing system 105 can execute the embeddings model to generate a set of corpus embeddings 136 using a corresponding corpus of data as input (which may be stored as part of the tensors 170 in the data lake 160). The embeddings model can include any machine learning model for generating embeddings. The Embeddings model can include one or more computational functions that can be trained/updated to produce dense numerical representations of input data samples, which may be stored in the tensors 170. The embeddings model can include, execute, or utilize machine learning techniques, such as deep neural networks, to produce any of the embeddings described herein. For example, the embeddings model can use tensors 170 as input and apply a series of operations, transformations, or layers to extract meaningful features from the data stored therein and generate one or more corresponding embeddings vectors. These embedding vectors can capture semantic or contextual characteristics of the input data samples, allowing for efficient computation, analysis, and downstream tasks.

In some implementations, a respective embeddings model may be trained/updated/executed for each embeddings space utilized by the data processing system 105 for the techniques described herein. For example, one embeddings model may be trained/updated to generate a corresponding set of corpus embeddings 136 for a set of image data. Another embeddings model may be trained/updated to generate a corresponding set of corpus embeddings 136 for a set of text data.

In some implementations, the embeddings model utilized to generate a set of corpus embeddings 136 for a specified corpus of information can be specified in a request to generate the set of corpus embeddings 136. For example, the client device 130 and/or the computing system 180 can transmit a request (e.g., in response to user input, etc.) to generate a set of corpus embeddings 136 from a specified corpus of information (which may be specified via a location in the data lake 160). In response to the request, the data processing system can retrieve the corresponding corpus of data and provide said data as input to a corresponding embeddings model. In some implementations, the data processing system 105 can automatically select the embeddings model for generation of the corpus of embeddings 136, for example, based on the type of data in the specified corpus. For example, the data processing system 105 can select a text-specific embeddings model if the corpus of input data includes text data, or an image-specific embeddings model if the corpus of input data includes images. Similar approaches may be utilized for other types of embeddings.

In some implementations, the embeddings model can be executed by one or more external computing systems (e.g., the client device 130, the computing system 180) to generate the corpus embeddings 136. In some implementations, one or more sets of corpus embeddings 136 can be provided by an external computing system 180 for storage in the data lake 160. In such implementations, the data processing system 105 can receive various metadata to index or otherwise store the received set(s) of corpus embeddings 136 in one or more tensors 170 in the data lake 160. The corpus embeddings 136 can be stored in association with one or more corpus identifiers, as well as an identifier of the embeddings space to which the corpus embeddings 136 correspond. Various additional metadata, such as identifiers of corresponding data or embeddings models used to generate the corpus embeddings 136, can be stored in the data lake 160.

To generate one or more transformation data structures, the data processing system 105 can utilize one or more training embeddings 138. The training embeddings 138 can be stored in association with corresponding mappings 140, which can map each set of training embeddings 138 to a corresponding set of results stored in a corresponding set of corpus embeddings 136. As described in further detail herein, input embeddings that may be used for techniques such as vector search, retrieval augmented generation, or general embeddings operation may be defined in a different, or subset of the embeddings space of corresponding corpus embeddings 136. To address this discrepancy, the data trainer 132 can generate, train, or otherwise update a transformation data structure 134 to automatically map the embeddings space of a set of training embeddings 138 to the embeddings space of the corresponding set of corpus embeddings.

The training embeddings 138 can be embeddings used as a set of training examples to generate a transformation data structure 134 based on the mappings 140 to corresponding portions of corresponding corpus embeddings 136. In one example, the training embeddings 138 can be embeddings generated from a particular query for which retrieval augmented generation is to be executed. Furthering this example, the corpus embeddings 136 that correspond to said training embeddings 138 can be embeddings of the corpus of information over which the retrieval augmented generation is to be executed. The training embeddings 138 may correspond to a subset of, or a different type of embeddings space than the corpus embeddings 136. To facilitate mapping between the different spaces, or to facilitate improved mapping within the same embeddings space, a transformation data structure 134 can be generated/trained/updated according to the techniques described herein to map the training embeddings 138 to the corpus embeddings 136.

In some implementations, multiple sets of training embeddings 138 and corresponding mappings 140 can be utilized to generate a transformation data structure 134. In one example, several hundred sets of training embeddings 138 and corresponding mappings 140 can be utilized in generating a transformation data structure 134 for a particular corpus (e.g., corresponding to a set of corpus embeddings 136). Each set of training embeddings 138 can represent a query, or set of data, which is to be used in a search or matching operation across the corresponding corpus. In one example, a query may be any type of text input that may be used to retrieve relevant information from a corresponding text, image, video, or audio corpus.

Embeddings for the query can be generated using similar techniques to those described herein (e.g., a corresponding embeddings model, etc.). The embeddings space for the training embeddings 138 may be different from that of the corpus embeddings 136 to which the training embeddings 138 correspond. For example, different embeddings models may be used to generate the corpus embeddings 136 and the corresponding training embeddings 138. In some implementations, the corpus embeddings 136 and the corresponding training embeddings 138 can be generated from the same embeddings model and share the same embeddings space. In such implementations, the transformation data structure 134 can be trained/updated/generated to better map embeddings generated from queries to relevant results in the corpus embeddings 136, achieving higher accuracy and performance when compared to conventional vector search operations.

In some implementations, the training embeddings 138 can be generated by the data processing system 105, the client device 130, and/or the computing system 180, using a corresponding set of query data or other input data and a selected embeddings model. The training embeddings 138 can be generated as an example that is used in connection with ground truth data to create a corresponding transformation data structure 134 using the techniques described herein. The ground truth data can be included in, or otherwise identified, by corresponding mappings 140. In some implementations, the mappings 140 can be generated in connection with the training embeddings 138.

A set of corresponding mappings 140, although shown as maintained in the data lake 160, can in some implementations be maintained in memory of the data processing system 105, the client device 130, and/or the computing system 180. Each mapping 140 in a set of mappings 140 can correspond to a respective query or input data used to generate a set of training embeddings 130. The mappings 140 can be explicit mappings (e.g., identifiers, memory locations, etc.) for relevant embeddings (e.g., vector search results) that are to be returned when executing vector search over a corresponding set of corpus embeddings 136 using a set of training embeddings 138. The mappings therefore define a ground truth for vector search operations, which can be used to generate/train/update a corresponding transformation data structure 134.

For example, a mapping 140 for a set of training embeddings 138 representing a vector search query may include, but is not limited to, identifiers of a set of corpus embeddings 136 that represent search results in the corresponding corpus that are determined to be relevant to the vector search query. In some implementations, mappings 140 may include significance scores for each of the relevant results for the vector search query. Each significance score can be a ground truth similarity value that is proportional to the desired similarity between the target embeddings 138 and the corresponding portions of the corpus embeddings 136 indicated as vector search results in the mappings 140.

The mappings 140 can be or include one or more data structures stored in association with a corresponding set of training embeddings 138. For example, the mappings 140 can be generated with the training embeddings 138 by identifying corresponding portions of the corpus relevant to the training embeddings 138. In some implementations, the mappings 140 can be generated prior to the training embeddings 138. For example, mappings 140 can first be generated as a list of portions of a corpus (e.g., lists of identifiers of corresponding portions of corpus embeddings 136) for which training embeddings 138 are to be generated. Once list of portions of the corpus have been identified, the corresponding portions of the corpus can be retrieved and used to generate a corresponding vector search input query (e.g., text data used to generate training embeddings 138).

Such queries may be generated via input to the data processing system 105, the client device 130, and/or the computing system 180, in some implementations. Similar input may be utilized to identify portions of the corpus (and/or corresponding corpus embeddings 136) that are to be included or otherwise identified in the mappings 140. As such, the mappings 140 can include identifiers of one or more portions of a corpus, acting as ground truth vector search results for a corresponding query. The ground truth search results listed as part of the mappings can include significance scores.

In some implementations, the data processing system 105 can utilize a corpus of data to generate corresponding mapping(s) 140 and/or training embeddings 138 automatically, for example, using a machine-learning model 182. In this example, the machine-learning model 182 is shown as being maintained and executed by a computing system 180. The computing system 180 can include one or more servers, computing systems, data centers (e.g., cloud computing systems), processors, and memory. The computing system 180 can be any type of computing system that can execute one or more machine-learning models 182. In some implementations, the computing system 180 can expose functionality of the one or more machine-learning models 182 to other computing systems (e.g., the client device 130, the data processing system 105, etc.) via one or more application programming interfaces (APIs).

The APIs can enable the data processing system 105 to provide information to the computing system 180 for use in executing the machine-learning model 180. Although furhter examples are described as the machine-learning model(s) 182 being executed by the computing system 180, it should be understood that in some implementations, the machine-learning model(s) 182 can be executed and/or maintained by any of the computing systems described herein, including the data processing system 105 and/or the client device 130.

In some implementations, the machine-learning model(s) 182 include one or more large-language models (LLMs). Large language models include generative models that are pre-trained on large amounts of text and can generate corresponding text in response to an input context. The input context can include text of arbitrary length, as well as requests corresponding thereto. In one example, the data processing system 105 can, given one or more identifiers of a corpus for which training embeddings 138 are to be generated, create a context for input to one or more of the machine-learning models 182.

To do so, the data processing system 105 can access and otherwise insert the data from the corpus into one or more templates for a given media type, corpus, or combinations thereof. The templates can be used to populate an example input context for a large language model (e.g., the machine learning model(s) 182). The data used to populate the template can include data from any suitable modality that is compatible with the machine-learning model 182, and may include text data, image data, video data, tensor data, audio data, binary data, or combinations thereof. The template can include any suitable data that forms a foundation for the context of the machine-learning model 182, and can include, for example, text that provides context for generating corresponding queries given an input context.

Said context data may include information (e.g., text data, etc.) that instructs the machine-learning model 182 to generate corresponding text-based queries that correspond to particular portions of a corpus (e.g., one or more portions of the corpus represented by the corpus embeddings 136). For example, the context data in a template may include instructions that cause the machine-learning model 182 to output one or more text-based queries for data in the corpus. In some implementations, the machine-learning model 182 may utilize one-shot or multi-shot generation. In such implementations, the context data in one or more templates can include previously generated example queries corresponding to portions of a corpus.

The previously generated example queries can be queries that are manually generated or may be previously executed queries over the same corpus. The portions of the corpus to which the queries correspond can be ground truth vector search results. As such, providing such examples to the machine-learning model 182 can instruct the machine-learning model 182 to generate text-based queries that would return a provided portion of a corpus of data if it were to be used in a vector search. In this way, the machine-learning model 182 can be utilized to generate synthetic training data (e.g., synthetic training embeddings 138) for a given corpus of information that is represented by one or more sets of corpus embeddings 136.

To generate the synthetic training embeddings 138 for a particular corpus represented by one or more sets of corpus embeddings 138, the data processing system 105 can populate one or more templates corresponding to the corpus, data types of the corpus, or default templates, among others. Populating the template can include inserting data (e.g., text data, etc.) from the corpus and/or training examples into the template. Once populated, the data processing system 105 can execute the machine-learning model 182 using the populated template (e.g., an input context) as input to the machine-learning model 182. In some implementations, the data processing system 105 itself can execute the machine-learning model 182. In some implementations, the data processing system 105 can execute the machine-learning model 182 by transmitting one or more API requests to the computing system 180, which subsequently executes the machine-learning model 182 to produce output data.

The output data produced by the machine-learning model 182 can be accessed, retrieved, or otherwise stored by the data processing system. As described herein, the input context for the machine-learning model 182 can cause the machine-learning model 182 to generate corresponding text-based queries that would result in the provided portions of a corpus being retrieved were the text-based query used in a search operation over said corpus of information. The machine-learning model 182 can be a general-purpose large language model, or a large language model that was specifically fine-tuned to generate text-based queries for input data. The text-based queries operate as synthetically generated training data for training/updating/generating the transformation data structures 134 described herein.

Once the text-based queries have been generated by the machine-learning model 182, the data processing system 105 (or any other computing system described herein) can execute one or more embeddings models that generate corresponding synthetic training embeddings 138. If ground truth training embeddings 138 have already been generated, the synthetic training embeddings 138 can utilize the same embeddings model to generate the synthetic training embeddings 138 as was used to generate the ground truth training embeddings 138. The data processing system 105 then generate corresponding mappings 140 for the synthetic training embeddings 138 generated using the machine-learning model 182. The mappings 140 can identify the corresponding portions of the corpus (e.g., identifiers of corresponding set(s) of corpus embeddings 136) that were used in the input prompt to generate the synthetic text-based query. In some implementations, the machine-learning model 182 can generate a synthetic significance score, which may be included in the mappings for the synthetically generated training embeddings 138.

In some implementations, multiple vector search results may be returned from a vector search (e.g., in situations where multiple portions of a corpus are relevant to an input query). The mappings 140 can include a list of multiple identifiers of corresponding portions of the corpus embeddings 136, representing multiple ground-truth vector search results. Each identifier in the list can be stored in association with a respective significance score, thereby indicating the respective relevance between the respective result and the one or more training embeddings 138 of the mappings 140. Further, including multiple results in the mappings 140 for a set of training embeddings 138 can improve the accuracy of trained transformation data structures 134. The mappings 140 can be generated in connection with the techniques described herein, including but not limited to techniques based on large-language models (e.g., the machine-learning model 182), or manual processes, among others.

Referring now to processes for training/updating/generating one or more transformation data structures 134, the data processing system 104 can, in some implementations, initiate a process for training/updating/generating one or more transformation data structures 134 in response to a request from a computing system (e.g., a client device 130, the computing system 180, etc.) or in response to input to the data processing system 105 (e.g., via an input/output device, etc.). In some implementations, the request can include or may specify a location of training data (e.g., one or more sets of training embeddings 138, one or more mappings 140), as well as one or corpuses (e.g., corpus embeddings 136) for which the transformation data structure 134 is to be generated/trained/updated. Once the process to generate/train/update the transformation data structure 134 is initiated, the data trainer 132 can identify and/or retrieve training data to generate/train/update the transformation data structure 134.

The transformation data structure 134 can be a data structure that includes values that are applied to a set of input embeddings to transform the set of input embeddings, which corresponds to a source embeddings space, into a transformed set of embeddings that correspond to a target embeddings space. In some implementations, the source and target embeddings spaces can be the same embedding spaces, and the transformation data structure 134 can transform values of the input embeddings to different locations within the same embeddings space. As described herein, the transformed embeddings generated by applying the transformation data structure 134 to the input embeddings can more accurately identify relevant results for a vector search operation compared with the same operation using the set of input embeddings 134. As such, the application of the transformation data structure 134 improves the accuracy and performance of vector search by mapping the input embeddings into a different embeddings space, or different locations within the same embeddings space, to retrieve more accurate results in said embeddings space.

In some implementations, applying the transformation data structure 134 can include multiplying a set of weight values stored in the transformation data structure 134 by each of the embeddings in a set of input embeddings. As described herein, a set of embeddings can be embeddings that represent a particular portion of data, for example, a text string (e.g., a sentence). In an example of a text-based embedding, each word in the text string can be encoded as a n-dimensional vector of numbers. Furthering this example, the text string, when encoded as embeddings, can be represented as a sequence of embeddings vectors, with each word being represented as a respective embedding vector. Similar approaches may be utilized to generate embeddings for other types of data, including images, video, audio, or binary data, among others.

In one example, the transformation data structure 134 can be a matrix or tensor, with each element in the matrix or tensor comprising a value that is trained/updated/generated according to the techniques described herein. Furthering this example, applying the transformation data structure 134 may include performing an affine, or linear, transformation on one or more input embeddings (which may be vectors of numbers, e.g., floating-point numbers). In such implementations, the transformation data structure 134 may be applied to a vector of embeddings by performing a matrix/tensor multiplication operation between the vector of embeddings (which may represent a word, for example) and the transformation data structure 134. The shape of the matrix of the transformation data structure 134 may be selected such that the resulting output vector produced by the multiplication operation conforms includes the number of dimensions of the target embeddings space for which the transformation data structure 134 was generated.

In some implementations, the transformation data structure 134 can include a vector, with element in the vector comprising a value that is trained/updated/generated according to the techniques described herein. In such implementations, the number of dimensions in the vector transformation data structure 134 can be equal to the number of dimensions of the embeddings vectors of the source embeddings space and equal to the number of dimensions of the embeddings vectors of the target embeddings space (which may be, in some implementations, the same as the source embeddings space). In such implementations, applying the transformation data structure 134 can include performing an element-wise calculation between the transformation data structure 134 and each input embeddings vector.

In some implementations, the transformation data structure 134 can include one or more neural network layers, such as fully connected or sparsely connected neural network models. In such implementations, the input layer of the neural network can correspond to the number of dimensions of the input embeddings from a source embeddings space and the number of neurons in the output layer can correspond to the number of dimensions of the output embeddings for the target embeddings space. The transformation data structure 134 can be applied by providing an input embedding vector as input to the neural network and executing each layer of the neural network to produce an output vector. The output vector can be embeddings that have been mapped to the target embeddings space for which the transformation data structure 134 was generated.

Once the process to train/update/generate the transformation data structure 134 has been initiated, the data trainer 132 can generate the transformation data structure 134 for the corpus embeddings 136. To do so, the data trainer 132 can allocate one or more regions of memory in the data processing system 105 for the transformation data structure 134. In some implementations, the request to create the transformation data structure 134 can indicate a type of transformation data structure to generate. In such implementations, the data trainer 132 can generate the corresponding type (e.g., matrix, etc.) of the transformation data structure 134.

In some implementations, the data trainer 132 can determine the attributes (e.g., shape, etc.) of the transformation data structure 134 based on the training embeddings 138 and/or corpus embeddings 136 specified for the training process. For example, the data trainer 132 can generate a matrix having a number of rows or columns based on the number of elements in the embeddings array of each embedding in the training embeddings 138 (e.g., the number of embeddings in the embeddings space of the training embeddings 138). In some implementations, the data trainer 132 can generate a matrix having a number of rows or columns based on the number of elements in the embeddings array of each embedding in the training embeddings 138 and/or the corpus embeddings (e.g., the number of embeddings in the embeddings space of the training embeddings 138).

In implementations where the corpus embeddings 138 have a different number of elements than the target embeddings, the data trainer 132 can generate a transformation data structure 134 (e.g., a matrix, tensor, etc.) such that the output of applying (e.g., matrix multiplication, etc.) a target embedding 138 to the transformation data structure 134 results in an output having the same number of dimensions as the target embeddings space (e.g., of the corpus embeddings 136). Similar approaches may be performed to generate other types of transformation data structures 134, such as vector or neural network-based transformation data structures 134.

Once generated, and as described herein, the data trainer 132 can access or otherwise utilize a dataset (e.g., information in the data lake 160, specified via requests described herein, etc.) to map a first set of embeddings (e.g., training embeddings 138) generated in a first embeddings space to a set of query results, which may be specified in the mappings 140 associated with the specified training embeddings 138. As described herein, the query results may include, for a set of training embeddings 138 representing a query, one or more sets of the corpus embeddings 136 indicating a search result for vector/embeddings search operation over specified corpus embeddings 136. Both the sets of training embeddings 138, corresponding mappings 140, and the corpus embeddings 136 may be specified as part of the request to generate/train/update one or more transformation data structures 134.

The data trainer 132 can iteratively update values of the transformation data structure 134 by using the each of the training embeddings 138 as input, applying the transformation data structure 134 to the training embeddings 138 to generate output embeddings, and performing a similarity calculation between the output embeddings and the ground truth data (e.g., the corpus embeddings 136 identified in the mappings 140 corresponding to the input training data). The similarity calculation can be any suitable similarity calculation and may include but is not limited to cosine similarity, Euclidean distance, Manhattan distance, Jaccard similarity, or Pearson correlation coefficient, among others.

The similarity calculation can generate a similarity score that indicative of a similarity between the transformed embeddings produced by applying the transformation data structure 134 (e.g., an intermediate iteration of the transformation data structure 134 during optimization/training) to the input training embeddings 138, and corresponding corpus embeddings 136 identified in the mappings 140 for the input training embeddings 138. The similarity value can be used to calculate a loss, or error, between the expected output (e.g., a high similarity value, as the corpus embeddings 136 identified in the mapping are intended to be ground truth search results) and the actual similarity score generated via vector/embeddings search using the transformed embeddings.

In some implementations, weakly supervised learning techniques can be used to calculate the loss. For example, the presence or absence of the corresponding corpus embedding(s) 136 identified in the mappings 140 in the results of the vector search performed using the transformed embeddings can be used to calculate the loss. In some implementations, the mappings 140 may include negative search results, which are portions of the corpus 136 that are not to be mapped to the corresponding training embeddings 138 during of the transformation data structure 134. The presence of said negative results in the vector search using the transformed embeddings can increase the loss, representing an increased error. Similarly, the presence of positive (e.g., relevant) results in the vector search using the transformed embeddings can decrease the loss, representing a decreased error.

Any suitable loss function or combination of loss functions may be utilized to determine the loss for training the transformation data structure 134. In some implementations, different numbers of training embeddings 138 may be provided as input as batches or mini batches, the error for each of the which can be combined to generate the loss function. In some implementations, if a set of training embeddings 138 corresponds to a single query, said set of set of training embeddings 138 can be individually transformed to generate a corresponding set of transformed embeddings, after which the vector search is performed using the corresponding set of transformed embeddings over the corpus embeddings 136 to calculate the loss for the set of training embeddings 138 using the mappings 140, as described herein.

Once the loss is calculated, the parameters (e.g., values) of the transformation data structure, the data trainer 132 can execute an optimization technique (e.g., gradient descent or variant thereof, an Adam optimizer or variant thereof, etc.) to minimize the error of the loss function. The data trainer 132 can iteratively perform optimization, by incrementally modifying the values of the transformation data structure 134 (e.g., values stored in a matrix), and repeatedly retrieving and providing additional training embeddings 138 as input according to training hyperparameters (e.g., batch size, number of epochs, etc.). This process can be repeated until a training termination condition is reached.

In some implementations, a validation set, which may include data similar to that used for training/optimization (e.g., training embeddings 138 and corresponding mappings 140), may be utilized to evaluate the performance of the transformation data structure 134 during a training/updating process. For example, the validation set may include a subset of the training dataset that is set aside and used to test the accuracy of the transformation data structure 134. In a non-limiting example, the accuracy of the transformation data structure 134 may be tested periodically (e.g., after predetermined numbers of training/updating examples have been used to train/update the transformation data structure 134, etc.). This process can be repeated until a training termination condition is reached, such as an accuracy threshold being met or upon using a predetermined number of training/updating examples to train/update the transformation data structure 134. The data trainer 132 can therefore update/train the transformation data structure 134 using the training embeddings 138 and mappings 140, such that the transformation data structure 134 can map input embeddings in the embeddings space of the training embeddings 138 into the embeddings of the corpus embeddings 136, thereby improving the performance of vector/embeddings search operations.

Once trained, the data processing system 105 can store the transformation data structure 134 in association with the corpus embeddings 136 for which the transformation data structure 134 was generated. The data processing system 105, upon one or more corresponding requests (e.g., via a client device 130, computing system 180, input to the data processing system 105, etc.) can access and update the transformation data structure 134. Updating the transformation data structure 134 can be performed using additional training embeddings 138 and corresponding additional mappings 140, which may be specified in the request or otherwise accessed by the data processing system 105 in response to the request. For example, the request may include additional training embeddings 138 and mappings 140, or a client device 130 (or other computing system) may provide additional training embeddings 138 and mappings 140, which are accessed by the data trainer 132 to update the transformation data structure 134 using the techniques described herein.

The data trainer 132 can store the transformation data structure 134 in association with indications of the embeddings spaces and/or models for which the transformation data structure 134 is to be used. For example, the transformation data structure 134 can be stored in association with an identifier of the embeddings model or embeddings space of the training embeddings 138 used to train/update the transformation data structure 134, as well as an identifier of the embeddings model or embeddings space of the corpus embeddings 136. The data processing system 105 can utilize the transformation data structure 134 to perform embeddings/vector search operations over the corpus embeddings 136. In some implementations, the data processing system 105 can utilize an intermediate version (e.g., a snapshot) of the transformation data structure 134 that is produced during training/updating, but prior to completing the full training process for the transformation data structure 134.

Referring to the query/vector search processing functionality of the data processing system 105, the query identifier 115 can identify one or more queries for a vector search operation. The vector search operation can identify one or more corpuses of embeddings to search, such as the corpus embeddings 136, which as described herein can include a respective number of tensors 170 in the data lake 160. The query can include any number of nested queries or sub-queries, operations, commands, or Python/NumPy-style bracket or range notation. In some implementations, the query can specify one or more transformation operations, grouping operations, ungrouping operations, or sampling operations. Queries or requests for vector search operations over a set of corpus embeddings 136 may sometimes be referred to as a "search operation," a "vector search operation," a "vector search," or a "request," or a "query."

The query identifier 115 can identify one or more search requests by receiving the queries/search requests from a computing device, such as the client device 130 or from an application, script, or other process executing on the data processing system 105, client device 130, or computing system 180. For example, the client device 130 may include a script that implements one or more APIs of the query identifier 115 and which provides the query identifier 115 with an indication of a query string/prompt, a corresponding identifier of the corpus embeddings 136 for which the search is to be executed, and in some implementations, an indication of an embeddings function with which to encode the input prompt/string.

In some implementations, the request can indicate a corresponding transformation data structure 134 to utilize for the embeddings search operation. In some implementations, the request can include an indication that an appropriate transformation data structure 134 is to be utilized for the search, and the query identifier 115 can identify the transformation data structure 134 based on the embeddings functions and/or corpus embeddings 136 specified in the request. For example, the transformation data structure 134 can select the transformation data structure 134 that has been trained over the specified set of corpus embeddings 136, and that has been trained using training embeddings 138 generated using the embeddings function specified in the request, if any. If no embeddings function is specified, the query identifier 115 can assume a generic or default embeddings function, select an embeddings function used to generate the specified corpus embeddings 136, or select an embeddings function used to generate the training embeddings 138 that trained the specified or identified transformation data structure 134. Any of the foregoing may be implemented according to internal configuration settings of the data processing system 105, or configuration settings specified by a client device 130 (or in the request). In some implementations, the client device 130 or the data processing system 105 can provide the query to the query identifier via a graphical user interface.

In some implementations, the vector search operation may be specified as part of a tensor query. Tensor queries can include both SQL keywords additional keywords that enable tensor-specific and dataset-specific functionality. For example, tensor queries can include range-based requests, which involve tensor slicing or indexing using Python or NumPy square bracket notation, for example. Range-based requests may be utilized to implement cropping functionality. Additionally processing keywords, such as normalization functions, mean, median, or mode functions, and addition/sum functions, among others, can be implemented as part of tensor queries, and may themselves operate on specified ranges or slices of tensors 170 in the multi-dimensional sample dataset. The queries can utilize additional square bracket notation to query multi-dimensional tensors 170. Queries can additionally include comparison operations for tensors 170 (or slices/indices of tensors), as well as tensor-based sums, multiplication operations, subtraction operations, division operations, or other mathematical operations.

In some implementations, the query identifier 115 may execute on the client device 130 as an embedded tensor searching engine and may be utilized either while training a model on a remote compute instance or in-browser compiled over WebAssembly. Once a query has been identified by the query identifier 115, the query can be passed to the query parser 117, which can parse the query to extract identifiers of the dataset, tensors 170 in the dataset, keywords, and user-defined functions, among other operations. In some implementations, the query parser 117 can perform a syntax checking operation to determine whether the syntax of the query is correct. For example, the query parser 117 can extract one or more string tokens from the query string in order and iterate over each string token and apply one or more tensor query syntax checking rules to determine whether the provided query is syntactically correct. The query parser 117 can determine whether specified transformation data structures 134 and corpus embeddings 136 exist in the data lake 160. Likewise, the query parser 117 can determine whether any specified embeddings functions can be executed by the data processing system 105, or if said embeddings functions are compatible with any specified transformation data structures 134 and/or If the query is determined to be syntactically correct, the query parser 117 can provide the query to the query executor 120 for execution. If a semantic error is detected in the query, the query parser 117 can generate an error message with an error identifier that identifies the error. The error identifier may be stored in association with the query, and the error message may be provided for display at the client device 130 or via a display device of the data processing system 105. In some implementations, the error message can include an indication of the location in query (e.g., the string token) where the error occurs, and may include an indication of the type of error or suggest a change to the query to make the query correct.

The query executor 120 can execute the vector search request/query by performing any operations for the query identified by the query identifier 115 and/or the query parser 117. Execution of the query can be delegated to external tensor computation frameworks such as PyTorch or XLA and efficiently utilize underlying accelerated hardware, in some implementations. The query executor 120 can execute the query/search operation by applying an identified or selected transformation data structure 134 to the data in the input query. In some implementations, prior to applying the transformation data structure 134, the query executor 120 can execute an embeddings function to generate a set of embeddings that represent the string/prompt in the request/query for the vector search operation. As described herein, the embeddings function may be specified in the query or identified based on the transformation data structure 134 and/or the specified corpus embeddings 136 that are to be searched.

The query executor 120 can execute the embeddings function using the input query string as input to generate a set of transformed query embeddings. The transformed query embeddings can correspond to a first embeddings space generated by the embeddings function, which may be different from the embeddings space of the corpus embeddings 136 that are to be searched. The query executor 120 can apply the transformation data structure 134 (trained/updated according to the techniques described herein) by performing operations described herein (e.g., matrix multiplication, element-wise product of vector, propagating through neural network, etc.). The query executor 120 can apply the transformation data structure 134 to each embeddings vector generated by executing the embeddings function over the input search query string. In some implementations, other data modalities (e.g., image(s), video(s), audio, etc.) may be provided in the input rather than a text string, and corresponding embeddings may be generated therefrom and used in connection with the transformation data structure 134, as described herein.

Once the transformed embeddings have been generated by applying the transformation data structure 134 to the input data in the query (or embeddings generated therefrom), the query executor 120 can execute a search operation over the corpus embeddings 136 specified in the request/query. To do so, the query executor 120 can execute a vector search operation. The vector search operation can include a similarity calculation between the transformed embeddings and the corpus embeddings 136 identified in the request/query. The similarity calculation can be any suitable similarity calculation and may include but is not limited to cosine similarity, Euclidean distance, Manhattan distance, Jaccard similarity, or Pearson correlation coefficient, among others.

As described herein, the corpus embeddings 136 may include multiple sets of embeddings data, which may represent portions of a larger corpus of data. In an example where the corpus of data is text information, each set of embeddings in the corpus embeddings 136 may correspond to a processed chunk, or portion, of the text information (e.g., a sentence, paragraph, predetermined number of words or characters, etc.). The similarity calculation can be performed for each set of embeddings data in the corpus embeddings and transformed embeddings in the query. The sets of embeddings data in the corpus embeddings 136 can be ranked according to the similarity score, and the query executor 120 can identify, in some implementations, a predetermined (or specified) number of top-scoring sets of embeddings data in the corpus embeddings 136. The query executor 120 can identify the data represented by the top-scoring corresponding sets of embeddings data in the corpus embeddings 136 from the data lake 160, which can be used to generate query results for the vector search operation.

In some implementations, the query executor 120 can generate a set of indices that point to locations of each tensor 170 storing the data represented by the top-scoring corresponding sets of embeddings data in the corpus embeddings 136 in the data lake 160. For example, once the relevant corpus embeddings 136 have been identified, and the data represented by said embeddings has been identified, a corresponding set of pointer values, references, or indices can be generated that identify the data of each result in the set of query results. The set of indices may be an array if the results are one-dimensional or may be a multi-dimensional data structure (e.g., a matrix, a tensor, etc.) if the set of query results return more than one type of tensor 170. In some implementations, the set of query results can be an array of indices that point to locations in the data lake 160 that store tensors 170 including the identified sets of embeddings data and information represented thereby.

In some implementations, the query executor 120 can format or transform the query result tensors 170, to conform to a particular shape or dimensionality specified in the query. Once generated, the set of query results can then be accessed by the data provider 125 to provide the set of query results as output. In some implementations, the query executor 120 can generate a set of query results by retrieving the data represented by the identified relevant corpus embeddings 136 and storing said data in one or more data structures. In some implementations, each query result can be stored in association with, or may include its respective similarity score. In some implementations, the data structure including the query results can be arranged or ordered according to the ranking of the query results.

The data provider 125 can provide the set of query results as output. The set of query results may be provided, for example, by the data provider 125 to a machine-learning system or process, such as a large language model or platform implementing retrieval augmented generation. In some implementations, the data provider 125 can provide the set of query results to the client device 130 or the computing system 180 (e.g., in a case where the client device 130 or the computing system 180 provided the query, and the data processing system 105 executed the query). In some implementations, the data provider 125 can provide the set of query results as indices that point to the tensor 170 data returned (or processed) from the query. Using the indices, the tensor 170 data corresponding to the query results can be retrieved from computer memory or from the data lake 160 (e.g., if the data was stored as a separate dataset, for example). In some implementations, the query results can include data retrieved form the data lake 160, which can be provided to the computing system (or process implemented by the data processing system 105) that provided the query/search operation.

The data provider 125 may store the set of query results in one or more data structures in the memory of the data processing system 105, the client device 130, or the computing system 180. The set of query results, or indices corresponding thereto, may be stored in association with the query from which the query results were generated. The set of query results may be cached and utilized in future queries or query operations, as described herein. The set of query results may be stored in a historic query database, for example, in association with the multi-dimensional sample dataset to which the query corresponds (e.g., if the dataset has write permissions for the user profile used to execute the query), or in the user profile used to execute the query. The data provider 125 may receive requests to execute historic queries/vector search operations and may provide the historic queries (and indications of any cached query results corresponding thereto) to the query identifier 115.

Although the foregoing descriptions of the query processing operations have been described herein as being performed by the data processing system 105, it should be understood that one or more of the operations of the data processing system 105 may instead be performed by the client device 130 and/or the computing system 180, or vice versa. For example, the client device 130 and/or the computing system 180 may perform any of the operations described herein, including but not limited to generating training data for training/updating/generating transformation data structures 134 using one or more machine-learning models 182 (e.g., large language models, transformer models, generative models, etc.), training/updating/generating transformation data structures 134, executing vector search queries using transformation data structures 134, and implementing said vector search results in machine-learning models (e.g., retrieval augmented generation), among others. Likewise, in some implementations, different querying operations may be performed by the data processing system 105 and the client device 105 and/or the computing system 180, with the query results being resolved via communications between the data processing system 105 and the client device 130 and/or the computing system 180.

Figure 2:
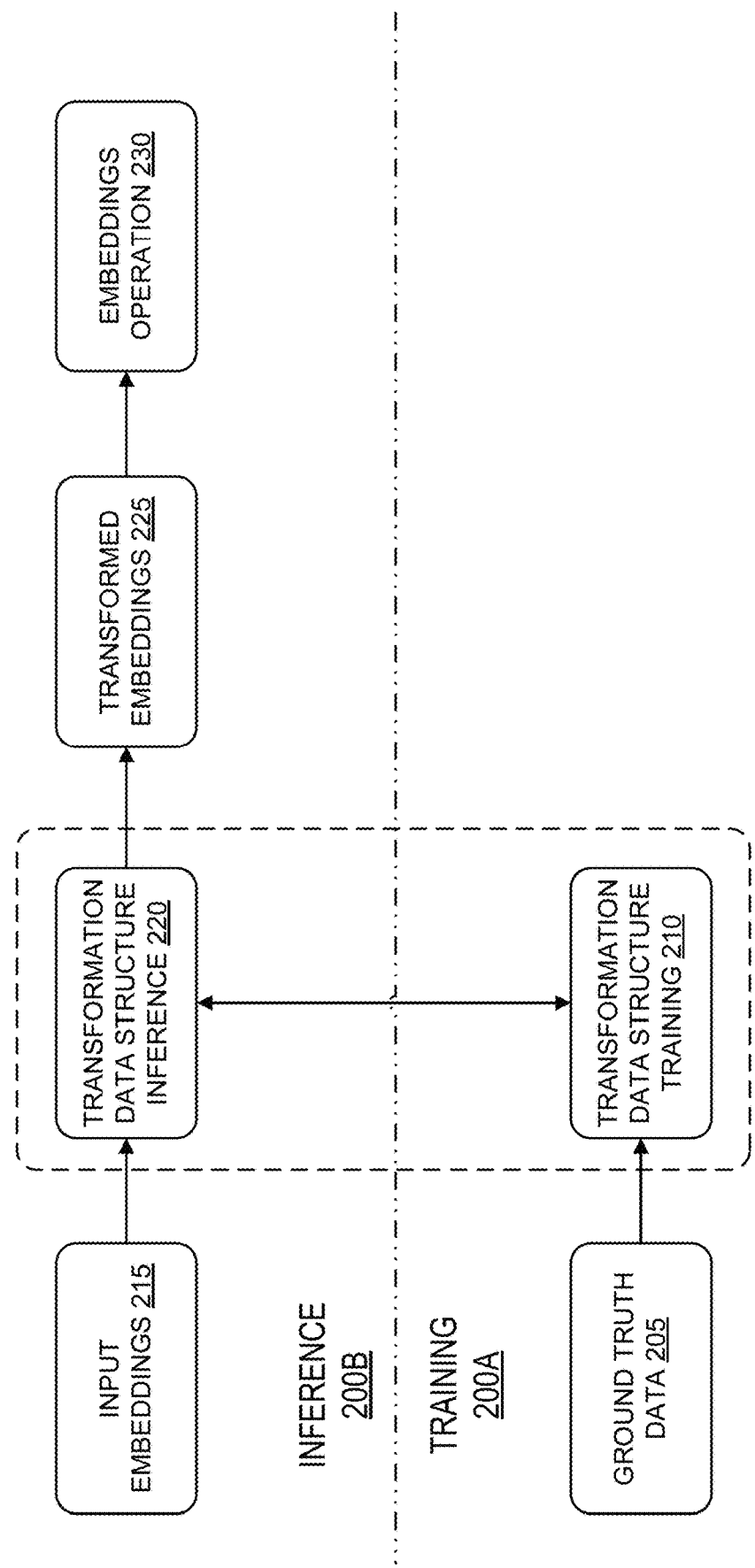
FIG. 2 illustrates an example dataflow diagram showing how transformation data structures are utilized in training and inference, in accordance with one or more implementations.

Referring to FIG. 2 in the context of the components described in connection with FIG. 1, illustrated is an example dataflow diagram showing how transformation data structures 134 are utilized in training and inference, in accordance with one or more implementations. As shown, during a training process 200A, the transformation data structure 134 is trained using a ground truth example data 205 (e.g., the training embeddings 138 and corresponding mappings 140 to corpus embeddings 136, etc.), by iteratively updating the transformation data structure using the techniques described herein (e.g., the transformation data structure training process 210). In some implementations, the data processing system 105 can generate the training embeddings 138 and corresponding mappings 140 based on a set of input ground truth data 205 and corresponding mappings to portions of the embeddings corpus 136. Iteratively updating the transformation data structure 134 can be performed according to any suitable optimization technique. The trained transformation data structure 134 can be stored in association with the embeddings corpus 136 to which the transformation data structure 134 corresponds and can be used to improve the accuracy and performance of vector search operations, during an inference process 200B.

During the inference process 200B, the transformation data structure 134 is applied to a set of input embeddings 215, which can be any type of data that has been transformed into embeddings for use in a vector search operation, for example. In some implementations, the input embeddings 215 include embeddings generating using the same embeddings model used to generate the ground truth data 205. Applying the transformation data structure 134 can be performed according to the techniques described herein and can generate a set of transformed embeddings 225. The transformed embeddings 225 can be embeddings transformed to conform to the embeddings space of the corpus. In some implementations, the embeddings space of the input embeddings 215 and the corpus embeddings 136 can be the same embeddings space, and the transformation data structure 134 can transform the input embeddings 215 into a representation that improves the perform of vector search in returning relevant results, as described in connection with FIG. 5. As shown, the transformed embeddings 225 are used as input an embeddings operation 230. One example embeddings operation 230 is a vector search operation, in which the transformed embeddings are used as a query over the corpus embeddings 136 to generate a set of query results, as described herein.

Figure 5:
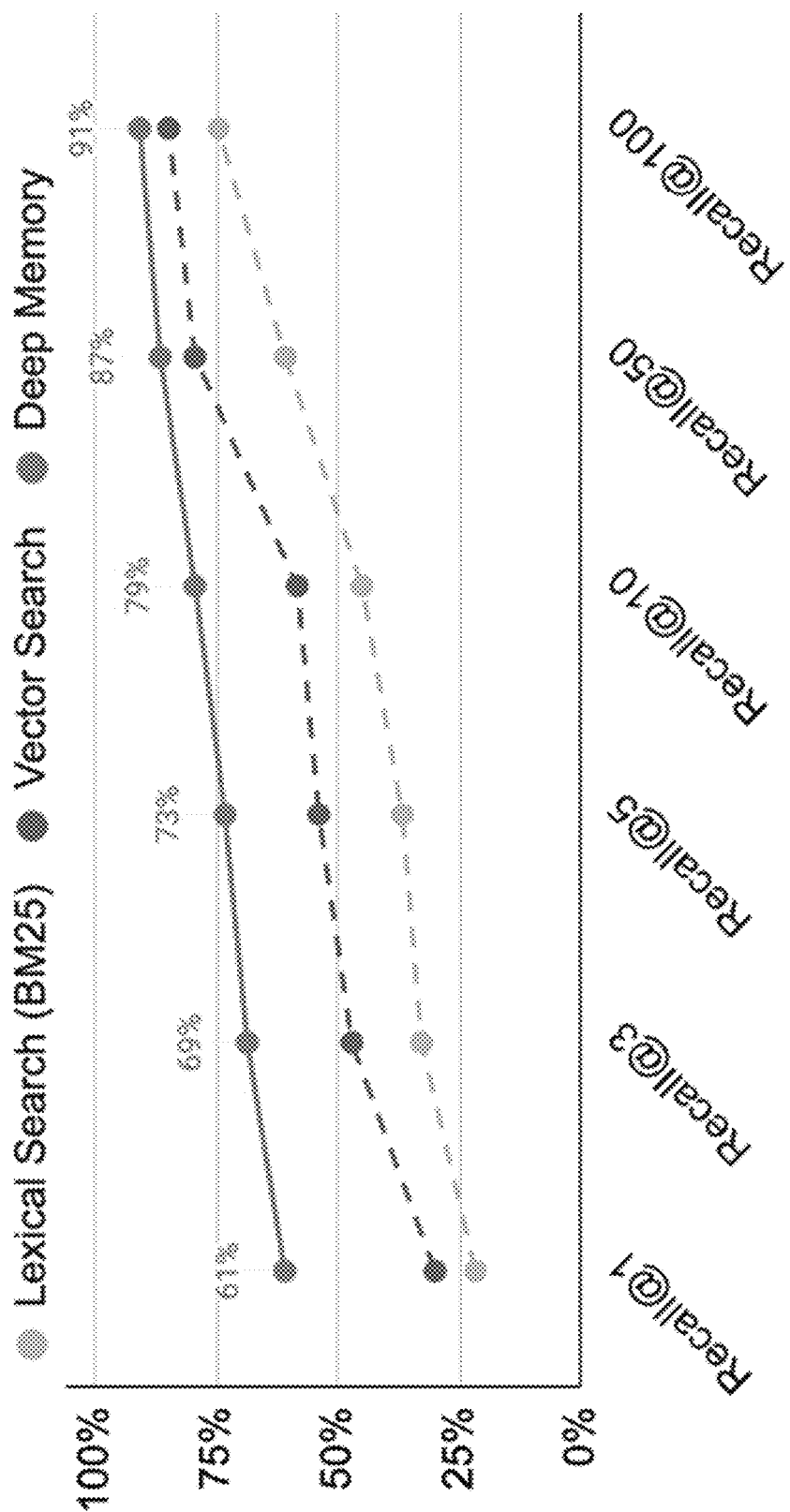
FIG. 5 is a graph illustrating example performance of an example implementation of the transformation data structures described herein.

Referring to FIG. 5, illustrated is an example graph 500 illustrating example performance of an example implementation of the transformation data structures described herein. As described herein, the present techniques (referenced as "Deep Memory") in the graph 500, include the generation and training of a transformation data structure, which can be applied to convert input embeddings (e.g., for a query) into an embedding space that is tailored for particular use cases, corpuses, or datasets. This increases the accuracy of embeddings operations, such as vector search. As shown in the graph 500, the techniques described herein indicate improvements over conventional approaches for vector search. In the graph 500, the x-axis indicates different vector search operations, where "recall@k" corresponds to the percentage of rows for which the correct (e.g., most relevant) information was returned in the top "k" vector search results.

Relative to conventional approaches, such as lexical search operations and conventional vector search, the techniques described herein, including the implementation of transformation data structures improves overall vector search performance. Moreover, when utilized in connection with large language models, the techniques described herein also be used to decrease overall computational requirements by reducing the amount of context that must be injected into the large language model prompt to achieve a given accuracy. Such approaches thereby reducing token usage, improving calculation time for generating large language model output.

Figure 3:
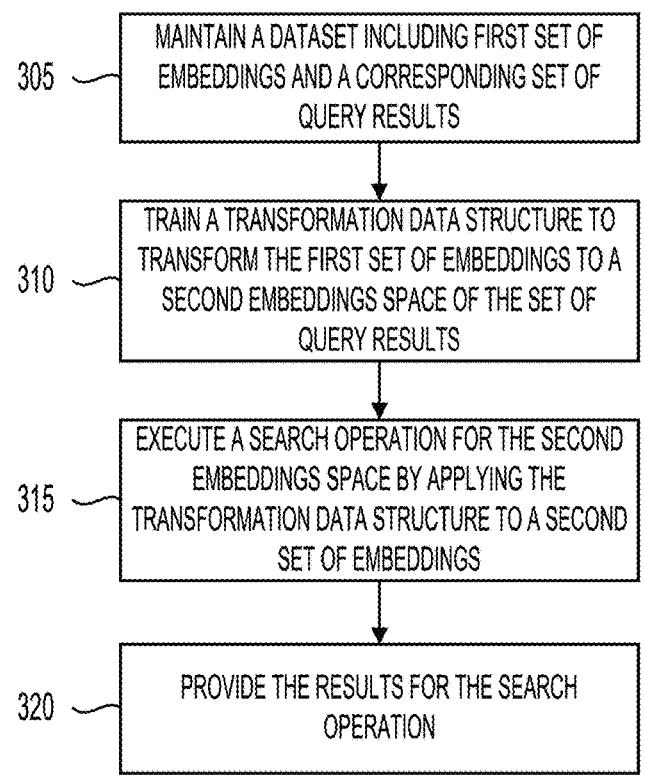
FIG. 3 illustrates a flow diagram of an example method of training and applying transformation data structures, in accordance with one or more implementations.

Referring to FIG. 3 in the context of the components described in connection with FIG. 1, illustrated is a flow diagram of an example method 300 of training and applying transformation data structures (e.g., the transformation data structures 134), in accordance with one or more implementations. The method 300 may be performed, for example, by the data processing system 105, the client device 130, the computing system 180, or any other computing system described herein. Although the method 300 is described as being performed by the data processing system 105, it should nevertheless be understood that any computing device may perform the various operations of the method 300 and communicate any results of the operations or intermediate computations relating to the operations to any other computing device described. The method 300 is described as having steps 305-320, however, it should be understood that the steps (referred to as ACTs) may be performed in any order, and that steps may be omitted, or additional steps may be performed to achieve useful results.

At ACT 305, the data processing system (e.g., the data processing system 105) can maintain a dataset including a first set of embeddings (e.g., the training embeddings 136) corresponding to a set of query results (e.g., portions of the corpus embeddings 136) for vector/embedding search operations. The first set of embeddings may sometimes be referred to as "training embeddings," and the set of query results may sometimes be referred to as "corpus embeddings." Maintaining the dataset can include, in some implementations, storing or receiving a corpus of data (e.g., text data, image data, video data, audio data, combinations thereof, etc.), generating embeddings for said corpus (e.g., the corpus embeddings 136) using an embeddings model, and storing said data in one or more vector databases (e.g., one or more sets of tensor 170 in the data lake 160). In some implementations, the data processing system may divide or otherwise process the corpus of data to generate multiple portions of the data. In an example where the portions include chunks of text data, corresponding corpus embeddings can be generated for each chunk of text data for inclusion in a set of corpus embeddings (e.g., the corpus embeddings 136) that represent the text information.

The first set of embeddings (e.g., training embeddings) can be embeddings used as a set of training examples to generate a transformation data structure (e.g., the transformation data structure 134) based on ground-truth mappings to corresponding portions of corresponding corpus embeddings (e.g., a second set of embeddings). In one example, the training embeddings can be embeddings generated from a particular query for which retrieval augmented generation is to be executed. Furthering this example, the corpus embeddings that correspond to said training embeddings can be embeddings of the corpus of information over which the retrieval augmented generation is to be executed. The training embeddings may correspond to a subset of, or a different type of embeddings space than the corpus embeddings. To facilitate mapping between the different spaces, or to facilitate improved mapping within the same embeddings space, a transformation data structure can be generated/trained/ updated according to the techniques described herein to map the training embeddings to the corpus embeddings.

In some implementations, multiple sets of training embeddings and corresponding mappings can be utilized to generate a transformation data structure. In one example, several hundred sets of training embeddings and corresponding mappings can be utilized in generating a transformation data structure for a particular corpus (e.g., corresponding to a set of corpus embeddings). Each set of training embeddings can represent a query, or set of data, which is to be used in a search or matching operation across the corresponding corpus. In one example, a query may be any type of text input that may be used to retrieve relevant information from a corresponding text, image, video, or audio corpus.

Embeddings for the query can be generated using similar techniques to those described herein (e.g., a corresponding embeddings model, etc.). The embeddings space for the training embeddings may be different from that of the corpus embeddings to which the training embeddings correspond. For example, different embeddings models may be used to generate the corpus embeddings and the corresponding training embeddings. In some implementations, the corpus embeddings and the corresponding training embeddings can be generated from the same embeddings model and share the same embeddings space. In such implementations, the transformation data structure can be trained/updated/generated to better map embeddings generated from queries to relevant results in the corpus embeddings, achieving higher accuracy and performance when compared to conventional vector search operations.

The mappings can be or include one or more data structures stored in association with a corresponding set of training embeddings. For example, the mappings can be generated with the training embeddings by identifying corresponding portions of the corpus embeddings relevant to the training embeddings. In some implementations, the mappings can be generated prior to the training embeddings. For example, mappings can first be generated as a list of portions of a corpus (e.g., lists of identifiers of corresponding portions of corpus embeddings 136) for which training embeddings are to be generated. Once list of portions of the corpus have been identified, the corresponding portions of the corpus can be retrieved and used to generate a corresponding vector search input query (e.g., text data used to generate training embeddings 138).

In some implementations, the data processing system can utilize a corpus of data to generate corresponding mapping(s) and/or training embeddings automatically, for example, using a machine-learning model (e.g., the machine-learning model 182). In some implementations, the functionality of one or more machine-learning models 182 can be accessed via one or APIs. The APIs can enable the data processing system to provide information to the computing system (e.g., the data processing system 105, the computing system 180, the client device 130, etc.) executing the machine-learning model. In some implementations, the machine-learning model(s) include one or more LLMs. In one example, the data processing system can, given one or more identifiers of a corpus for which training embeddings are to be generated, create a context for input to one or more of the machine-learning models, as described herein. The machine learning model can be executed to generate corresponding training queries, which can be encoded using a corresponding embeddings model to generate the training embeddings (e.g., the first set of embeddings) corresponding to the mappings for the corpus dataset.

At ACT 310, the data processing system can train/update/generate a transformation data structure (e.g., the transformation data structure 134) to transform the first set of embeddings to a second embeddings space of the set of query results. In one example, the transformation data structure can be a matrix or tensor, with each element in the matrix or tensor comprising a value that is trained/updated/generated according to the techniques described herein. Furthering this example, applying the transformation data structure may include performing an affine, or linear, transformation on one or more input embeddings (which may be vectors of numbers, e.g., floating-point numbers). In such implementations, the transformation data structure may be applied to a vector of embeddings by performing a matrix/tensor multiplication operation between the vector of embeddings (which may represent a word, for example) and the transformation data structure. The shape of the matrix of the transformation data structure may be selected such that the resulting output vector produced by the multiplication operation conforms includes the number of dimensions of the target embeddings space for which the transformation data structure was generated.

In some implementations, the transformation data structure can include a vector, with element in the vector comprising a value that is trained/updated/generated according to the techniques described herein. In such implementations, the number of dimensions in the vector transformation data structure can be equal to the number of dimensions of the embeddings vectors of the source embeddings space and equal to the number of dimensions of the embeddings vectors of the target embeddings space (which may be, in some implementations, the same as the source embeddings space). In such implementations, applying the transformation data structure can include performing an element-wise calculation between the transformation data structure and each input embeddings vector.

In some implementations, the transformation data structure can include one or more neural network layers, such as fully connected or sparsely connected neural network models. In such implementations, the input layer of the neural network can correspond to the number of dimensions of the input embeddings from a source embeddings space and the number of neurons in the output layer can correspond to the number of dimensions of the output embeddings for the target embeddings space. The transformation data structure can be applied by providing an input embedding vector as input to the neural network and executing each layer of the neural network to produce an output vector. The output vector can be embeddings that have been mapped to the target embeddings space for which the transformation data structure was generated.

Once the process to train/update/generate the transformation data structure has been initiated, the data processing system can generate the transformation data structure for the corpus embeddings. To do so, the data processing system can allocate one or more regions of memory in the data processing system for the transformation data structure. In some implementations, the request to create the transformation data structure can indicate a type of transformation data structure to generate. In such implementations, the data processing system can generate the corresponding type (e.g., matrix, etc.) of the transformation data structure. The transformation data structure can be generated according to the techniques described herein (e.g., in connection with the data trainer 132 of FIG. 1).

Once generated, and as described herein, the data processing system can access or otherwise utilize a dataset (e.g., information in the data lake 160, specified via requests described herein, etc.) to map the first set of embeddings (e.g., training embeddings) generated in a first embeddings space to a set of query results, which may be specified in the mappings associated with the specified training embeddings. As described herein, the query results may include, for a set of training embeddings representing a query, one or more sets of the corpus embeddings indicating a search result for vector/embeddings search operation over specified corpus embeddings. Both the sets of training embeddings, corresponding mappings, and the corpus embeddings may be specified as part of the request to generate/train/update one or more transformation data structures.

The data processing system can iteratively update values of the transformation data structure by using the each of the training embeddings as input, applying the transformation data structure to the training embeddings to generate output embeddings, and performing a similarity calculation between the output embeddings and the ground truth data (e.g., the corpus embeddings identified in the mappings corresponding to the input training data). The similarity calculation can be any suitable similarity calculation and may include but is not limited to cosine similarity, Euclidean distance, Manhattan distance, Jaccard similarity, or Pearson correlation coefficient, among others.

The similarity calculation can generate a similarity score that indicative of a similarity between the transformed embeddings produced by applying the transformation data structure (e.g., an intermediate iteration of the transformation data structure during optimization/training) to the input training embeddings, and corresponding corpus embeddings identified in the mappings for the input training embeddings. The similarity value can be used to calculate a loss, or error, between the expected output (e.g., a high similarity value, as the corpus embeddings identified in the mapping are intended to be ground truth search results) and the actual similarity score generated via vector/embeddings search using the transformed embeddings.

In some implementations, weakly supervised learning techniques can be used to calculate the loss. For example, the presence or absence of the corresponding corpus embedding(s) identified in the mappings in the results of the vector search performed using the transformed embeddings can be used to calculate the loss. In some implementations, the mappings may include negative search results, which are portions of the corpus that are not to be mapped to the corresponding training embeddings during of the transformation data structure. The presence of said negative results in the vector search using the transformed embeddings can increase the loss, representing an increased error. Similarly, the presence of positive (e.g., relevant) results in the vector search using the transformed embeddings can decrease the loss, representing a decreased error.

Any suitable loss function or combination of loss functions may be utilized to determine the loss for training the transformation data structure. In some implementations, different numbers of training embeddings may be provided as input as batches or mini batches, the error for each of the which can be combined to generate the loss function. In some implementations, if a set of training embeddings corresponds to a single query, said set of set of training embeddings can be individually transformed to generate a corresponding set of transformed embeddings, after which the vector search is performed using the corresponding set of transformed embeddings over the corpus embeddings to calculate the loss for the set of training embeddings using the mappings, as described herein.

Once the loss is calculated, the parameters (e.g., values) of the transformation data structure, the data processing system can execute an optimization technique (e.g., gradient descent or variant thereof, an Adam optimizer or variant thereof, etc.) to minimize the error of the loss function. The data processing system can iteratively perform optimization, by incrementally modifying the values of the transformation data structure (e.g., values stored in a matrix), and repeatedly retrieving and providing additional training embeddings as input according to training hyperparameters (e.g., batch size, number of epochs, etc.). This process can be repeated until a training termination condition is reached.

In some implementations, a validation set, which may include data similar to that used for training/optimization (e.g., training embeddings and corresponding mappings), may be utilized to evaluate the performance of the transformation data structure during a training/updating process. For example, the validation set may include a subset of the training dataset that is set aside and used to test the accuracy of the transformation data structure. In a non-limiting example, the accuracy of the transformation data structure may be tested periodically (e.g., after predetermined numbers of training/updating examples have been used to train/update the transformation data structure, etc.). This process can be repeated until a training termination condition is reached, such as an accuracy threshold being met or upon using a predetermined number of training/updating examples to train/update the transformation data structure. The data processing system can therefore update/train the transformation data structure using the training embeddings and mappings, such that the transformation data structure can map input embeddings in the embeddings space of the training embeddings into the embeddings of the corpus embeddings, thereby improving the performance of vector/embeddings search operations.

At ACT 315, the data processing system can execute a search operation for the second embeddings space (e.g., over the corpus embeddings) by applying the transformation data structure trained in ACT 310 to a second set of embeddings (e.g., embeddings of an input vector search query). The second set of embeddings may be generated, for example, using a corresponding embeddings model used to generate the first set of embeddings (e.g., the training embeddings). If the vector search query includes a string, the data processing system execute the embeddings function using the input query string as input to generate a set of transformed query embeddings.

The transformed query embeddings can correspond to a first embeddings space generated by the embeddings function, which may be different from the embeddings space of the corpus embeddings that are to be searched. The data processing system can apply the transformation data structure (trained/updated according to the techniques described herein) by performing operations described herein (e.g., matrix multiplication, element-wise product of vector, propagating through neural network, etc.). The data processing system can apply the transformation data structure to each embeddings vector generated by executing the embeddings function over the input search query string. In some implementations, other data modalities (e.g., image(s), video(s), audio, etc.) may be provided in the input rather than a text string, and corresponding embeddings may be generated therefrom and used in connection with the transformation data structure, as described herein.

Once the transformed embeddings have been generated by applying the transformation data structure to the input data in the query (or embeddings generated therefrom), the data processing system can execute a search operation over the corpus embeddings specified in the request/query. To do so, the data processing system can execute a vector search operation. The vector search operation can include a similarity calculation between the transformed embeddings and the corpus embeddings identified in the request/query. The similarity calculation can be any suitable similarity calculation and may include but is not limited to cosine similarity, Euclidean distance, Manhattan distance, Jaccard similarity, or Pearson correlation coefficient, among others.

As described herein, the corpus embeddings may include multiple sets of embeddings data, which may represent portions of a larger corpus of data. In an example where the corpus of data is text information, each set of embeddings in the corpus embeddings may correspond to a processed chunk, or portion, of the text information (e.g., a sentence, paragraph, predetermined number of words or characters, etc.). The similarity calculation can be performed for each set of embeddings data in the corpus embeddings and transformed embeddings in the query. The sets of embeddings data in the corpus embeddings can be ranked according to the similarity score, and the data processing system can identify, in some implementations, a predetermined (or specified) number of top-scoring sets of embeddings data in the corpus embeddings. The data processing system can identify the data represented by the top-scoring corresponding sets of embeddings data in the corpus embeddings from the data lake 160, which can be used to generate query results for the vector search operation.

In some implementations, the data processing system can generate a set of indices that point to locations of the data represented by the top-scoring corresponding sets of embeddings data in the corpus embeddings. For example, once the relevant corpus embeddings have been identified, and the data represented by said embeddings has been identified, a corresponding set of pointer values, references, or indices can be generated that identify the data of each result in the set of query results. The set of indices may be an array if the results are one-dimensional or may be a multi-dimensional data structure (e.g., a matrix, a tensor, etc.) if the set of query results return more than one type of tensor. In some implementations, the set of query results can be an array of indices that point to locations in memory that store tensors including the identified sets of embeddings data and information represented thereby.

At ACT 320, the data processing system can provide the results for the search operation. The data processing system can provide the set of query results as output. The set of query results may be provided, for example, by the data processing system to a machine-learning system or process, such as a large language model or platform implementing retrieval augmented generation. In some implementations, the data processing system can provide the set of query results to a client device or a computing system (e.g., in a case where the client device or the computing system provided the query, and the data processing system 105 executed the query). In some implementations, the data processing system can provide the set of query results as indices that point to tensor data returned (or processed) from the query. Using the indices, the tensor data corresponding to the query results can be retrieved from computer memory or from a data lake (e.g., data lake 160, if the data was stored as a separate dataset, for example). In some implementations, the query results can include data retrieved form the data lake, which can be provided to the computing system (or process implemented by the data processing system 105) that provided the query/search operation.

The data processing system may store the set of query results in one or more data structures in the memory of the data processing system 105, the client device, or the computing system. The set of query results, or indices corresponding thereto, may be stored in association with the query from which the query results were generated. The set of query results may be cached and utilized in future queries or query operations, as described herein. The set of query results may be stored in a historic query database, for example, in association with the multi-dimensional sample dataset to which the query corresponds (e.g., if the dataset has write permissions for the user profile used to execute the query), or in the user profile used to execute the query. The data processing system may receive requests to execute historic queries/vector search operations and may provide the historic queries (and indications of any cached query results corresponding thereto) to a requesting device or user.

Figure 4:
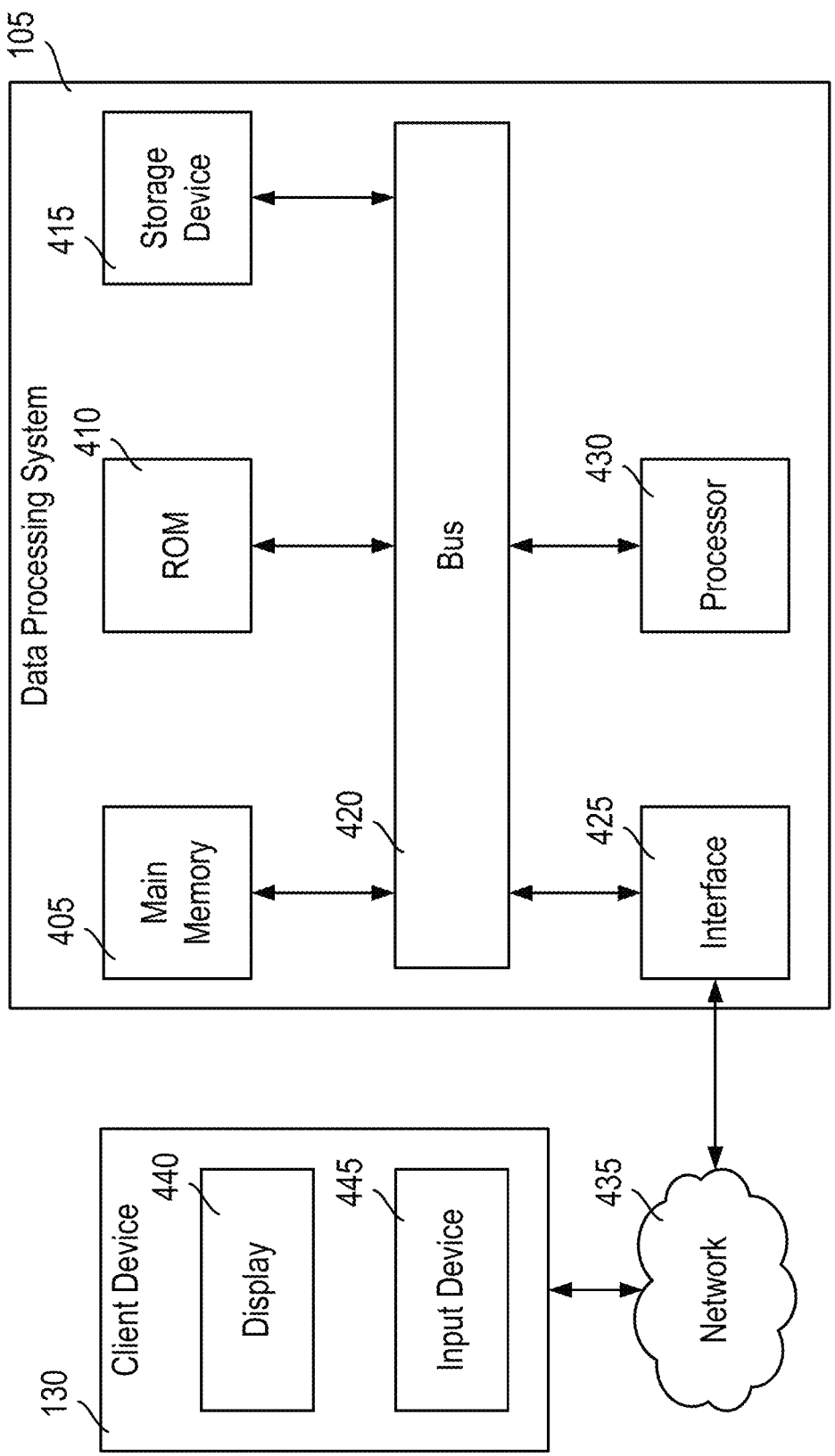
FIG. 4 is a block diagram of an example data processing system and computing environment that may be utilized to perform various techniques or operations described herein, in accordance with one or more implementations.

Referring to FIG. 4, an implementation of the data processing system 105 is shown that can be used, for example, to implement the systems and methods described with reference to FIGS. 1-15. The computing architecture described in FIG. 4 can be used for the data processing system 105 or the client device 130. The data processing system 105 includes a bus 420 or other communication component for communicating information and a processor 430 coupled to the bus 420 for processing information. The data processing system 105 also includes main memory 405, such as a random-access memory (RAM) or other dynamic storage device, coupled to the bus 420 for storing information, and instructions to be executed by the processor 430. The main memory 405 can also be used for storing position information, temporary variables, or other intermediate information during execution of instructions by the processor 430. The data processing system 105 may further include a read only memory (ROM) 410 or other static storage device coupled to the bus 420 for storing static information and instructions for the processor 430. A storage device 415, such as a solid-state device, magnetic disk, or optical disk, is coupled to the bus 420 for persistently storing information and instructions.

The data processing system 105 may be coupled via the bus 420 to a display 440, such as a liquid crystal display, or active-matrix display, for displaying information to a user. The display 440 can be a display of the client device 130. An input device 445, such as a keyboard including alphanumeric and other keys, may be coupled to the bus 420 for communicating information, and command selections to the processor 430. The input device 445 can be a component of the client device 130. The input device 445 can include a touch screen display 440. The input device 445 can include a cursor control, such as a mouse, a trackball, or cursor direction keys, for communicating direction information and command selections to the processor 430 and for controlling cursor movement on the display 440.

The data processing system 105 can include an interface 425, such as a networking adapter. The interface 425 may be coupled to bus 420 and may be configured to enable communications with a computing or communications network 435 and/or other computing systems, e.g., the client device 130. Any type of networking configuration may be achieved using interface 425, such as wired (e.g., via Ethernet), wireless (e.g., via Wi-Fi, Bluetooth, etc.), pre-configured, ad-hoc, LAN, WAN, etc.

According to various implementations, the processes that effectuate illustrative implementations that are described herein can be achieved by the data processing system 105 in response to the processor 430 executing an arrangement of instructions contained in main memory 405. Such instructions can be read into main memory 405 from another computer-readable medium, such as the storage device 415. Execution of the arrangement of instructions contained in main memory 405 causes the data processing system 105 to perform the illustrative processes described herein. One or more processors in a multi-processing arrangement may also be employed to execute the instructions contained in main memory 405. In alternative implementations, hard-wired circuitry may be used in place of or in combination with software instructions to implement illustrative implementations. Thus, implementations are not limited to any specific combination of hardware circuitry and software.

Although an example processing system has been described in FIG. 4, implementations of the subject matter and the functional operations described in this specification can be carried out using other types of digital electronic circuitry, or in computer software, firmware, or hardware, including the structures disclosed in this specification and their structural equivalents, or in combinations of one or more of them.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for execution of queries on tensor datasets, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
   one or more processors coupled to non-transitory memory, the one or more processors configured to:
   store a dataset comprising a first set of embeddings corresponding to a first embeddings space and stored in association with a set of query results for the first set of embeddings, the set of query results corresponding to a second embeddings space;
   train a transformation data structure using the first set of embeddings and the set of query results, the transformation data structure to transform the first set of embeddings to the second embeddings space, wherein the first embeddings space is different from the second embeddings space; and
   execute a search operation for the second embeddings space by applying the transformation data structure to a second set of embeddings corresponding to the first embeddings space.

2. The system of claim 1, wherein the dataset further comprises a corpus of text data corresponding to the second embeddings space.

3. The system of claim 1, wherein the one or more processors are further configured to execute the search operation over a corpus of embeddings corresponding to the second embeddings space.

4. The system of claim 3, wherein the one or more processors are further configured to:
generate a set of transformed embeddings based on an intermediate transformation data structure and the first set of embeddings; and
determine an error based on the set of transformed embeddings and the set of query results.

5. The system of claim 4, wherein the one or more processors are further configured to update the intermediate transformation data structure according to the error to generate the transformation data structure.

6. The system of claim 4, wherein the one or more processors are further configured to determine the error based on a similarity search between the set of transformed embeddings and the set of query results.

7. The system of claim 1, wherein the one or more processors are further configured to:
receive a first query specifying the second set of embeddings; and
execute the search operation in response to the first query.

8. The system of claim 7, wherein the one or more processors are further configured to execute the search operation during training of the transformation data structure in response to the first query.

9. A method, comprising:
storing, by one or more processors coupled to non-transitory memory, a dataset comprising a first set of embeddings corresponding to a first embeddings space and stored in association with a set of query results for the first set of embeddings, the set of query results corresponding to a second embeddings space;
training, by the one or more processors, a transformation data structure using the first set of embeddings and the set of query results, the transformation data structure to transform the first set of embeddings to the second embeddings space, wherein the first embeddings space is different from the second embeddings space; and
executing, by the one or more processors, a search operation for the second embeddings space by applying the transformation data structure to a second set of embeddings corresponding to the first embeddings space.

10. The method of claim 9, wherein the dataset further comprises a corpus of text data corresponding to the second embeddings space.

11. The method of claim 9, further comprising executing, by the one or more processors, the search operation over a corpus of embeddings corresponding to the second embeddings space.

12. The method of claim 11, wherein training the transformation data structure comprises:
generating, by the one or more processors, a set of transformed embeddings based on an intermediate transformation data structure and the first set of embeddings; and
determining, by the one or more processors, an error based on the set of transformed embeddings and the set of query results.

13. The method of claim 12, further comprising updating, by the one or more processors, the intermediate transformation data structure according to the error to generate the transformation data structure.

14. The method of claim 12, further comprising determining, by the one or more processors, the error based on a similarity search between the set of transformed embeddings and the set of query results.

15. The method of claim 9, further comprising:
receiving, by the one or more processors, a first query specifying the second set of embeddings; and
executing, by the one or more processors, the search operation in response to the first query.

16. The method of claim 15, further comprising executing, by the one or more processors, the search operation during training of the transformation data structure in response to the first query.

17. A system, comprising:
one or more processors coupled to non-transitory memory, the one or more processors configured to:
store a dataset comprising a first set of embeddings corresponding to a first embeddings space and stored in association with a set of query results for the first set of embeddings, the set of query results corresponding to a second embeddings space;
train a transformation data structure using the first set of embeddings and the set of query results, the transformation data structure to transform the first set of embeddings to the second embeddings space, wherein the second embeddings space is a subset of the first embeddings space; and
execute a search operation for the second embeddings space by applying the transformation data structure to a second set of embeddings corresponding to the first embeddings space.

18. A method, comprising:
storing, by one or more processors coupled to non-transitory memory, a dataset comprising a first set of embeddings corresponding to a first embeddings space and stored in association with a set of query results for the first set of embeddings, the set of query results corresponding to a second embeddings space;
training, by the one or more processors, a transformation data structure using the first set of embeddings and the set of query results, the transformation data structure to transform the first set of embeddings to the second embeddings space, wherein the second embeddings space is a subset of the first embeddings space; and
executing, by the one or more processors, a search operation for the second embeddings space by applying the transformation data structure to a second set of embeddings corresponding to the first embeddings space.

* * * * *